US012334235B2

(12) United States Patent
Akiyama et al.

(10) Patent No.: US 12,334,235 B2
(45) Date of Patent: *Jun. 17, 2025

(54) MULTILAYER VARISTOR

(71) Applicant: Panasonic Intellectual Property Management Co., Ltd., Osaka (JP)

(72) Inventors: Yuto Akiyama, Hokkaido (JP); Ryosuke Usui, Hokkaido (JP); Ken Yanai, Hokkaido (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 308 days.

This patent is subject to a terminal disclaimer.

(21) Appl. No.: 18/064,650

(22) Filed: Dec. 12, 2022

(65) Prior Publication Data

US 2023/0197321 A1 Jun. 22, 2023

(30) Foreign Application Priority Data

Dec. 21, 2021 (JP) ................................ 2021-207375

(51) Int. Cl.
*H01C 7/112* (2006.01)
*H01C 7/18* (2006.01)

(52) U.S. Cl.
CPC ............... *H01C 7/112* (2013.01); *H01C 7/18* (2013.01)

(58) Field of Classification Search
CPC ................................. H01C 7/112; H01C 7/18
See application file for complete search history.

(56) References Cited

U.S. PATENT DOCUMENTS 6,060,017 A * 5/2000 Yang ......................... B22F 1/09 419/38
7,994,893 B2 * 8/2011 Matsuoka ............ C04B 35/453 338/21
9,959,975 B2 * 5/2018 Inoue ................... H01G 4/1209
2003/0043012 A1 * 3/2003 Shiraishi ................ H01C 7/102 338/21
2004/0119579 A1 * 6/2004 Takehana ............ H01C 17/283 338/20

(Continued)

FOREIGN PATENT DOCUMENTS

JP 2003-151805 A 5/2003
JP 2010027730 A * 2/2010

OTHER PUBLICATIONS

JP201027730 machine translation (Year: 2010).*

*Primary Examiner* — Kyung S Lee
(74) *Attorney, Agent, or Firm* — Rimon P.C.

(57) ABSTRACT

A multilayer varistor of the present disclosure includes a sintered body, a first internal electrode, a second internal electrode, a first external electrode, a second external electrode, and a high-resistance layer. The first internal electrode and the second internal electrode are disposed in the sintered body. The first external electrode is disposed on a surface of the sintered body and is electrically connected to the first internal electrode. The second external electrode is disposed on the surface of the sintered body and is electrically connected to the second internal electrode. The high-resistance layer covers at least part of the surface of the sintered body, and the high-resistance layer has a surface having a plurality of cracks.

13 Claims, 3 Drawing Sheets

(56) References Cited

U.S. PATENT DOCUMENTS

| | | | | |
|---|---|---|---|---|
| 2009/0021340 A1* | 1/2009 | Koyama | H01C 7/18 | 338/20 |
| 2016/0090661 A1* | 3/2016 | Kitada | H01C 7/021 | 338/22 R |
| 2023/0143255 A1* | 5/2023 | Akiyama | H01C 7/18 | 338/20 |

* cited by examiner

MULTILAYER VARISTOR

CROSS-REFERENCE TO RELATED APPLICATION

The present application is based upon and claims the benefit of priority to Japanese Patent Application No. 2021-207375, filed on Dec. 21, 2021, the entire contents of which are incorporated herein by reference.

TECHNICAL FIELD

The present disclosure relates to multilayer varistors. The present disclosure specifically relates to a multilayer varistor including a sintered body having a laminate structure including a plurality of layers stacked on each other.

BACKGROUND ART

A varistor is used, for example, to protect various types of electronic apparatuses, electronic devices, and the like from abnormal voltages caused by lightning surges, static electricity, and the like, and to prevent the electronic apparatuses, electronic devices, and the like from malfunctioning due to noises generated in their circuits.

Literature 1 (JP 2003-151805 A) discloses a chip-type electronic component. The chip-type electronic component includes: a ceramic body; a glass-coating layer coated on at least part of surfaces of the ceramic body; and external electrodes on both end surfaces of the ceramic body. In Literature 1, the thickness of the glass-coating layer is set to be greater than or equal to a predetermined value, thereby suppressing plating from depositing on the surface of the ceramic body during plating. Literature 1 discloses a PTC-thermistor and a varistor as examples of the chip-type electronic component.

Application of a voltage to a varistor in a high-humidity environment may results in the occurrence of a phenomenon called migration in which insulation failure occurs due to the migration of ionized metal between the electrodes.

SUMMARY

An object of the present disclosure is to provide a multilayer varistor in which the occurrence of migration is suppressed.

A multilayer varistor of an aspect of the present disclosure includes a sintered body, a first internal electrode, a second internal electrode, a first external electrode, a second external electrode, and a high-resistance layer. The first internal electrode and the second internal electrode are disposed in the sintered body. The first external electrode is disposed on a surface of the sintered body and is electrically connected to the first internal electrode. The second external electrode is disposed on the surface of the sintered body and is electrically connected to the second internal electrode. The high-resistance layer covers at least part of the surface of the sintered body. The high-resistance layer has a surface having a plurality of cracks.

BRIEF DESCRIPTION OF THE DRAWINGS

The figures depict one or more implementation in accordance with the present teaching, by way of example only, not by way of limitations. In the figures, like reference numerals refer to the same or similar elements.

DETAILED DESCRIPTION

Embodiment

(1) Overview

Note that the drawings to be referred to in the following description of embodiment are schematic representations. Thus, the sizes, thicknesses, and other attributes of the respective constituent elements illustrated on those drawings are not always to scale, compared with actual ones.

Figure 1:
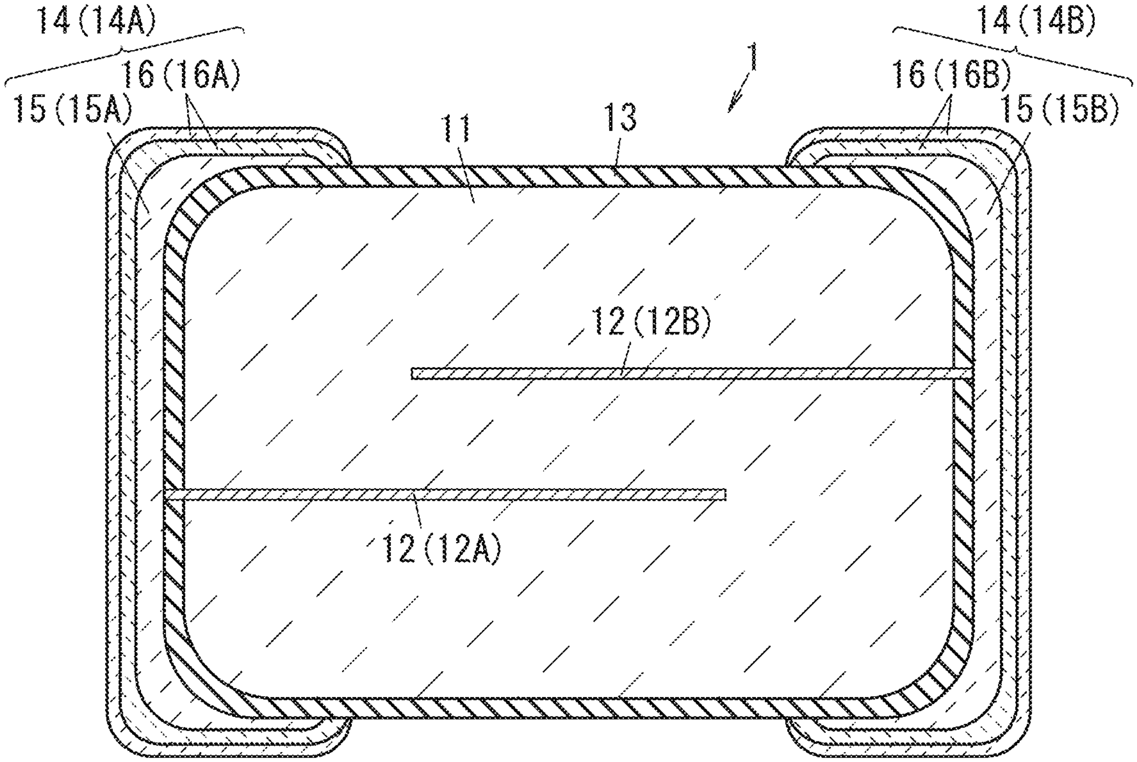
FIG. 1 is a schematic sectional view of a multilayer varistor according to an embodiment of the present disclosure.

As shown in FIG. 1, a multilayer varistor 1 includes a sintered body 11, a first internal electrode 12A, a second internal electrode 12B, a first external electrode 14A, a second external electrode 14B, and a high-resistance layer 13.

The first internal electrode 12A and the second internal electrode 12B are disposed in the sintered body 11.

The first external electrode 14A is disposed on a surface of the sintered body 11 and is electrically connected to the first internal electrode 12A.

The second external electrode 14B is disposed on the surface of the sintered body 11 and is electrically connected to the second internal electrode 12B.

The high-resistance layer 13 has higher resistance than the sintered body 11. The high-resistance layer 13 covers at least part of the surface of the sintered body 11. The high-resistance layer 13 has a surface having a plurality of cracks 20 (see FIG. 3).

Application of a voltage between the first external electrode 14A and the second external electrode 14B in a high-humidity environment may cause a phenomenon called migration. When metal of the external electrode on the anode side of the first external electrode 14A and the second external electrode 14B is ionized, moves to the external electrode on the cathode side, and is produced as metal at the external electrode on the cathode side, an insulation failure may occur between the first external electrode 14A and the second external electrode 14B.

To deal with this problem, the multilayer varistor 1 of the present embodiment has a plurality of cracks 20 provided in the high-resistance layers 13. Here, the "surface" of the high-resistance layer 13 refers to a surface that is not covered with another layer (e.g., the first external electrode 14A or the second external electrode 14B) and that is an exposed area of the high-resistance layer 13. The plurality of cracks 20 provided in the surface of the high-resistance layer 13 increase the creepage distance between the first external electrode 14A and the second external electrode 14B, that is, the distance of a path along the surface of the high-resistance layer 13 between the first external electrode 14A and the second external electrode 14B. Thus, even when the application of a voltage between the first external electrode 14A and the second external electrode 14B in a high-humidity environment results in elution of metal ions from the external electrode on the anode side, the metal ions have to move an increased distance to reach the external electrode on the cathode side. Therefore, a migration barrier against the metal ions eluted from the external electrode on the anode side is increased, thereby suppressing the occurrence of the migration.

(2) Details (2.1) Configuration of Multilayer Varistor

Figure 2:
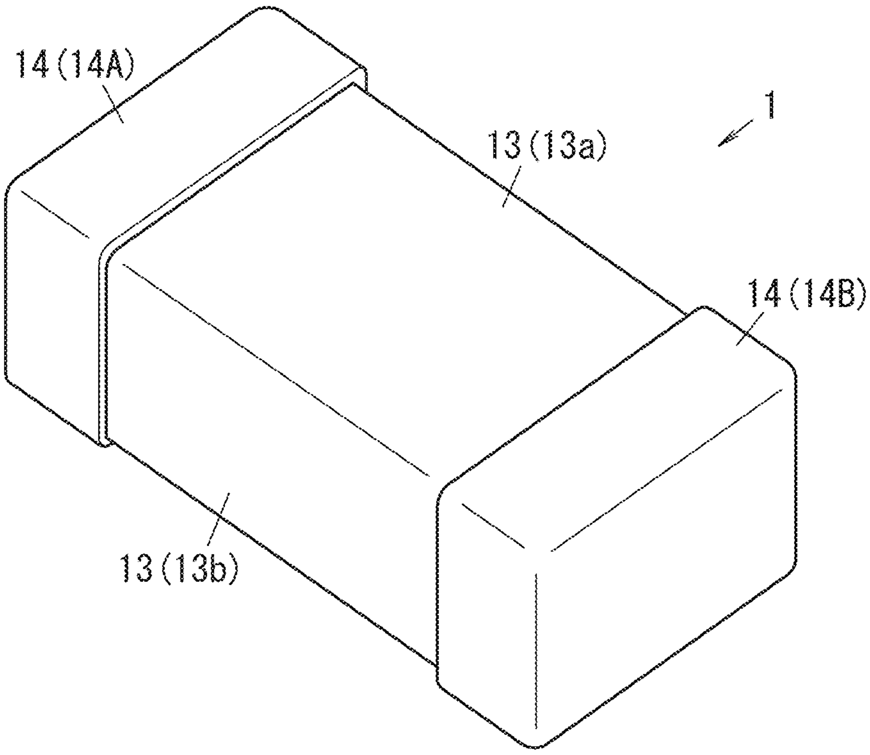
FIG. 2 is a schematic external perspective view of the multilayer varistor.
Figure 3:
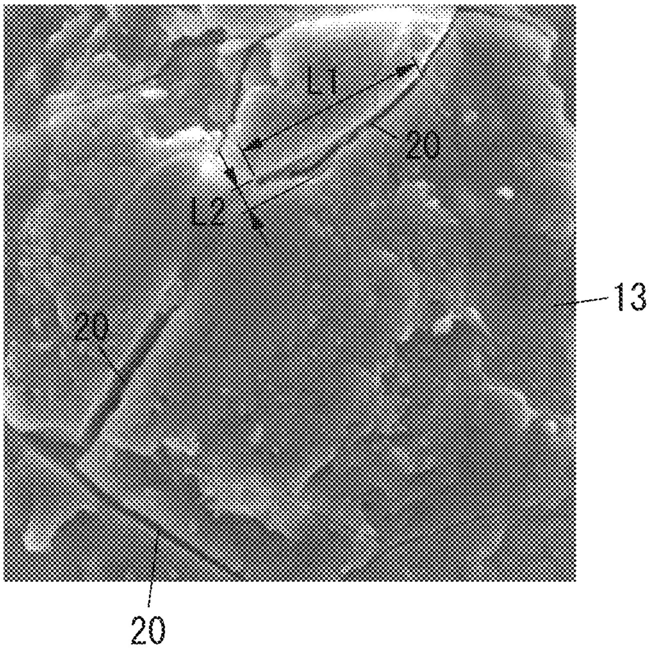
FIG. 3 is an image obtained by scanning a surface of a high-resistance layer included in the multilayer varistor with a scanning electron microscope.

The multilayer varistor 1 according to an embodiment of the present disclosure will be described with reference to FIGS. 1 to 3.

FIG. 1 is a schematic sectional view of the multilayer varistor 1. FIG. 2 is a schematic external perspective view of the multilayer varistor 1.

As described above, the multilayer varistor 1 includes the sintered body 11, the first internal electrode 12A, the second internal electrode 12B, the first external electrode 14A, the second external electrode 14B, and the high-resistance layer 13.

The sintered body 11 is formed in the shape of a rectangular parallelepiped whose long side is in the left/right direction in the direction shown in FIG. 1. The sintered body 11 has a laminate structure including a plurality of layers stacked on each other in the up/down direction in the direction shown in FIG. 1. The sintered body 11 includes a semiconductor ceramic component having nonlinear resistance characteristics. The semiconductor ceramic component having nonlinear resistance characteristics and constituting the sintered body 11 includes, for example, ZnO as a major component and includes at least one of $Bi_2O_3$, $Co_2O_3$, $MnO_2$, $Sb_2O_3$, $Pr_6O_{11}$, $Co_2O_3$, $CaCO_3$, or $Cr_2O_3$ as a minor component. The plurality of layers constituting the sintered body 11 is formed by, for example, baking ceramic sheets including these components, whereby the major component such as ZnO and some of the minor components are sintered to form a solid solution, and the remaining minor components deposit on grain boundaries between the major component and the minor components.

More specifically, ceramic sheets each including ZnO as a major component are stacked on each other to obtain a laminate, which is then cut perpendicularly to a lamination surface of the laminate to obtain a piece, and the piece is baked, thereby producing the sintered body 11. The sintered body 11 thus produced includes, for example, a shape having a pair of main surfaces opposite to each other, a pair of side surfaces opposite to each other, and a pair of end surfaces opposite to each other. The "main surfaces" are surfaces parallel to lamination surfaces. Of two types of cut surfaces, surfaces having larger areas are the "side surfaces", and surfaces having smaller areas are the "end surfaces". The shape of the sintered body 11 is, for example, a rectangular parallelepiped having two each of these surfaces, that is, a total of six surfaces. For example, an upper surface and a lower surface are the main surfaces, and a left surface and a right surface are the end surfaces in the direction shown in FIG. 1. Note that in FIG. 1, of the high-resistance layer 13, high-resistance layers 13 on the main surfaces are denoted as high-resistance layers 13*a*, and high-resistance layers 13 on the side surfaces are denoted as high-resistance layers 13*b*.

The first internal electrode 12A and the second internal electrode 12B are both disposed in the sintered body 11. The first internal electrode 12A and the second internal electrode 12B are arranged in the sintered body 11 such that at least part of the first internal electrode 12A and at least part of the second internal electrode 12B overlap each other in the up/down direction. The first internal electrode 12A and the second internal electrode 12B include Ag, Pd, PdAg, PtAg, or the like. The first internal electrode 12A and the second internal electrode 12B are formed by, for example, stacking ceramic sheets on each other to which an electrode material has been applied and by baking the ceramic sheets. The first internal electrode 12A and the second internal electrode 12B may collectively be referred to as internal electrodes 12.

The high-resistance layer 13 is disposed to cover at least part of the sintered body 11. In the present embodiment, the high-resistance layer 13 is disposed to cover substantially the entire surface of the sintered body 11 except for portions where the first internal electrode 12A and the second internal electrode 12B are exposed. However, the high-resistance layer 13 may be disposed to cover a portion, provided with neither the first external electrode 14A nor the second external electrode 14B, of the surface of the sintered body 11.

The main component of the high-resistance layer 13 is, for example, $SiO_2$. Covering the surface of the sintered body 11 with the high-resistance layer 13 including, as a major component, $SiO_2$ having a higher resistivity than resistivity of the sintered body 11 enables the occurrence of migration to be suppressed while plating deposition is suppressed. The main component of the high-resistance layer is not limited to $SiO_2$. The main component of the high-resistance layer may be $ZnSiO_4$. Also in this case, the occurrence of migration can be suppressed while plating deposition is suppressed. Alternatively, the main component of the high-resistance layer may be borosilicate glass. Also in this case, the occurrence of migration can be suppressed while plating deposition is suppressed.

The high-resistance layer 13 is formed by, for example, the following method. That is, the surface of the sintered body 11 is spray coated with a solution including a component constituting the high-resistance layer 13, and then, the sintered body 11 is sintered, thereby forming the high-resistance layer 13 on the surface of the sintered body 11.

The average thickness of the high-resistance layer 13 is preferably greater than or equal to 0.01 μm and less than or equal to 5 μm. The average thickness of the high-resistance layer 13 is preferably greater than or equal to 0.01 μm. In this case, the surface of the sintered body 11, which is a base of the high-resistance layer 13, is suppressed from being exposed. This can suppress the occurrence of the migration. Further, the average thickness of the high-resistance layer 13 is preferably less than or equal to 5 μm. In this case, a high-resistance layer 13 having a stable thickness can be formed on the surface of the sintered body 11. The "average thickness" of the high-resistance layer 13 refers to an arithmetic mean value of the thicknesses of the high-resistance layers 13 measured at a plurality of points (for example, any ten points) of the high-resistance layer 13.

Here, the solution spray-coated on the surface of the sintered body 11 shrinks by being baked, thereby forming the plurality of cracks 20 (see FIG. 3) in the surface of the high-resistance layer 13. FIG. 3 shows an example of an image obtained by photographing the surface of the high-resistance layer 13 with, for example, a scanning electron microscope. The plurality of cracks 20 have various shapes but are generally in the shape of elongated grooves. The number and shape of the plurality of cracks 20 formed in the surface of the high-resistance layer 13 are controllable by adjusting, for example, the concentration, temperature, application amount, heat treatment temperature, heat treatment time period, and the like of the solution to be spray-coated on the surface of the sintered body 11.

Here, the cracks 20 each have the deepest portion which is preferably located within the high-resistance layer 13. That is, the deepest portion of each crack 20 does not reach the surface of the sintered body 11 but remains within the high-resistance layer 13. That is, no crack is formed in the sintered body 11, which is the base of the high-resistance layer 13, and therefore, the strength of the sintered body 11 is not impaired, and the strength of the sintered body 11 can be maintained at a certain level or higher. This can reduce the possibility of breakage of the multilayer varistor 1 even when the multilayer varistor 1 receives mechanical stress such as a vibration or an impact.

The arithmetic mean value of lengths L1 which are dimensions in the longitudinal direction of the cracks 20 is preferably, for example, greater than or equal to 10 μm and less than or equal to 50 μm. The image of the surface of the high-resistance layer 13 is observed to determine lengths of a predetermined number (for example, any ten) of cracks 20, and the mean value of the lengths is calculated, thereby obtaining the arithmetic mean value of the lengths L1 of the cracks 20. The image of the surface of the high-resistance layer 13 is, for example, an image captured by a scanning electron microscope or an electron probe micro analyzer (EPMA). The shape of each crack 20 is controlled such that the arithmetic mean value of the lengths L1 of the cracks 20 is greater than or equal to 10 μm and less than or equal to 50 μm, and thus, increasing the creepage distance can reduce the possibility that the migration occurs while reducing the possibility that the surface of the sintered body 11 as the base is exposed.

The arithmetic mean value of widths L2 which are the dimensions of the cracks 20 in the transverse direction is preferably, for example, greater than or equal to 0.1 μm and less than or equal to 2 μm. The arithmetic mean value of the widths L2 of the cracks 20 is obtained by observing an image captured by a scanning electron microscope, an electron probe microanalyzer, or the like, as in the case of the length L1, to determine widths of a predetermined number of cracks 20 (for example, any ten cracks), and calculating the mean value of the widths. The shape of each crack 20 is controlled such that the arithmetic mean value of the widths L2 of the cracks 20 is greater than or equal to 0.1 μm and less than or equal to 2 μm, and thus, increasing the creepage distance can reduce the possibility that the migration occurs while reducing the possibility that the surface of the sintered body 11 as the base is exposed.

The total of areas of the plurality of cracks 20 formed in the surface of the high-resistance layer 13 is preferably greater than or equal to 2.5% and less than or equal to 3.5% of the surface area (the area of the exposed portion) of the high-resistance layer 13. Setting the total of the areas of the plurality of cracks 20 to greater than or equal to 2.5% of the surface area of the high-resistance layer 13 can increase the creepage distance between the first external electrode 14A and the second external electrode 14B, thereby reducing the possibility that the migration occurs. In addition, the total area of the plurality of cracks 20 is set to be less than or equal to 3.5% of the surface area of the high-resistance layer 13, thereby suppressing the strength of the high-resistance layer 13 from decreasing.

In the multilayer varistor 1 of the present embodiment, the number and shape of the plurality of cracks 20 formed in the surface of the high-resistance layer 13 are adjusted to adjust the arithmetic mean roughness (hereinafter also referred to as Ra) of the surface of the high-resistance layer 13. Here, the arithmetic mean roughness of the surface of the high-resistance layer 13 is preferably, for example, greater than or equal to 0.06 μm and less than or equal to 0.9 μm. The Ra of the surface of the high-resistance layer 13 is preferably greater than or equal to 0.06 and in this case, the occurrence of the migration at the surface of the high-resistance layer 13 can be suppressed. When the Ra of the surface of the high-resistance layer 13 is less than 0.06 μm, the creepage distance between the two external electrodes 14 is short, and the migration is likely to occur. Moreover, the Ra of the surface of the high-resistance layer 13 is preferably less than or equal to 0.9 μm, and in this case, the possibility that the sintered body 11 as the base is exposed can be reduced, and the occurrence of plating deposition is thus suppressed, so that the occurrence of the migration is suppressed. When the Ra of the surface of the high-resistance layer 13 is less than or equal to 0.9 μm, the advantage is also provided that the flux component of solder is less likely to remain on the surface.

The Ra of the surface of the high-resistance layer 13 can be measured in accordance with, for example, a method defined by Japanese Industrial Standards JIS-B0601: (2013), and specifically, can be measured by using Surfcorder (e.g., ET4000A manufactured by Kosaka Laboratory Ltd.) which is a highly accurate microfigure measuring instrument. The Ra of the surface of the high-resistance layer 13 can also be measured by, for example, a scanning probe microscope or a non-contact laser microscope.

In the multilayer varistor 1, the first external electrode 14A and the second external electrode 14B are disposed on the pair of end surfaces, and in the present embodiment, the first external electrode 14A is disposed on the end surface at the left of the sintered body 11, and the second external electrode 14B is disposed on the end surface at the right of the sintered body 11. The first external electrode 14A is electrically connected to the first internal electrode 12A, and the second external electrode 14B is electrically connected to the second internal electrode 12B. Here, the first external electrode 14A and the second external electrode 14B may be collectively referred to as external electrodes 14.

Each of the external electrodes 14 includes, for example, the primary electrode 15 and the plating electrodes 16. A secondary electrode may be further provided on the primary electrode 15. The secondary electrode is preferably formed to cover the primary electrode 15. As described above, each of the external electrodes 14 (the first external electrode 14A and the second external electrode 14B) may have a multilayer configuration. In the following description, the primary electrode 15 and the plating electrode 16 constituting the first external electrode 14A may be referred to as a primary electrode 15A and a plating electrode 16A, respectively, and the primary electrode 15 and the plating electrode 16 constituting the second external electrode 14B may be referred to as a primary electrode 15B and a plating electrode 16B, respectively.

The primary electrodes 15 are provided to cover part of the high-resistance layer 13 and to be electrically connected to the internal electrodes 12. The primary electrodes 15, for example, include a metallic component such as Ag, AgPd, or AgPt, and a glass component such as $Bi_2O_3$, $SiO_2$, or $B_2O_5$. The primary electrodes 15 preferably include metal as a major component, and more preferably include silver as the major component. When the primary electrodes 15 include silver as a main component, the migration is likely to occur, but the multilayer varistor 1 of the present embodiment has the plurality of cracks 20 provided in the surface of the high-resistance layer 13, thereby suppressing the occurrence of migration. The primary electrodes 15 are usually formed by applying a paste-like metal material for forming the primary electrodes 15 to part of the high-resistance layer 13.

The plating electrodes 16 are provided to cover at least part of the primary electrodes 15. Each plating electrode 16 includes: a Ni electrode provided, for example, such that the Ni electrode covers at least part of the primary electrode 15 or the secondary electrode disposed on the primary electrode 15; and a Sn electrode provided to cover at least part of the Ni electrode.

The multilayer varistor 1 is mounted on a printed circuit board on which an electric circuit is to be formed. The multilayer varistor 1 is to be connected, for example, to an input side of the electric circuit. When a voltage is applied between the first external electrode 14A and the second external electrode 14B, one of the first external electrode 14A and the second external electrode 14B serves as an electrode on the high potential side (anode side), and the other of the first external electrode 14A and the second external electrode 14B serves as an electrode on the low potential side (cathode side). When a voltage exceeding a predetermined threshold voltage is applied between the first external electrode 14A and the second external electrode 14B, the electric resistance between the first external electrode 14A and the second external electrode 14B rapidly decreases, and a current flows through a layer including a semiconductor ceramic component and present be the first external electrode 14A and the second external electrode 14B, and therefore, the electric circuit downstream of the multilayer varistor 1 can be protected.

(2.2) Method of Manufacturing Multilayer Varistor

An example of the method of manufacturing the multilayer varistor 1 of the present embodiment will be described below. The method of manufacturing the multilayer varistor 1 is not limited to the following method but may accordingly be modified.

The method of manufacturing the multilayer varistor 1 includes, for example, a first step, a second step, a third step, and a fourth step. Each of the steps will be described below.

[First Step]

The first step includes preparing the sintered body 11 including ZnO as a major component, the internal electrodes 12 being disposed in the sintered body 11.

A plurality of ceramic sheets are formed from a slurry including ZnO. To a surface of one of two ceramic sheets of the plurality of ceramic sheets, an internal electrode paste which will be the first internal electrode 12A is applied, and to a surface of the other of the two ceramic sheets, an internal electrode paste which will be the second internal electrode 12B is applied. Then, the plurality of ceramic sheets are stacked on each other, are pressed and cut, and then, debindered and baked, thereby forming the sintered body 11.

Note that the slurry for forming the ceramic sheets can be prepared, for example, by mixing ZnO which is a main raw material, and at least one of $Bi_2O_3$, $Co_2O_3$, $MnO_2$, $Sb_2O_3$, $Pr_6O_{11}$, $Co_2O_3$, $CaCO_3$, or $Cr_2O_3$ which is a minor raw material, and a binder together.

Examples of the internal electrode paste include a Ag-paste, a Pd-paste, a Pt-paste, a PdAg paste, and a PtAg paste.

A temperature at which the debindering is performed is, for example, higher than or equal to 300° C. and lower than or equal to 500° C. A temperature at which the sintering is performed is appropriately adjustable depending on the configuration, composition, and the like of the sintered body 11 to be obtained, and is, for example, higher than or equal to 800° C. and lower than or equal to 1300° C.

The first step includes, for example, a coating step, an internal electrode application step, a lamination step, a cutting step, and a baking step. In the coating step, ceramic sheets including ZnO as a major component are produced. In the internal electrode application step, the internal electrode paste is applied to surfaces of some of the ceramic sheets. Examples of an application method in the internal electrode application step include printing. In the lamination step, the ceramic sheets to which the internal electrode paste has been applied and the ceramic sheets to which the internal electrode paste has not been applied are stacked on each other to obtain a laminate. In the cutting step, the laminate is cut to obtain a laminate body having lamination surfaces and cut surfaces. In the baking step, the laminate body is baked to obtain a sintered body having lamination surfaces (the main surfaces) and cut surfaces (the side surfaces and the end surfaces).

Such a method can produce a sintered body 11 having a pair of main surfaces opposite to each other, a pair of side surfaces opposite to each other, and a pair of end surfaces opposite to each other.

[Second Step]

In the second step, the high-resistance layer 13 is formed to cover at least part of the sintered body 11 after the first step.

Examples of the method of forming the high-resistance layer 13 include a method (i) of applying a solution including a precursor of the high-resistance layer 13 to the sintered body 11, a method (ii) of reacting $SiO_2$ with the sintered body 11 including ZnO as a major component, and a method (iii) of thermally diffusing alkali-metal into the sintered body 11.

The method (i) includes applying the solution including the precursor of the high-resistance layer 13 to the sintered body 11 and then performing dehydration and curing, thereby forming the high-resistance layer 13 on the surface of the sintered body 11. Examples of the precursor of the high-resistance layer 13 include a glass component such as polysilazane having Si in its main chain. Using the glass component such as polysilazane having Si in its main chain as the precursor of the high-resistance layer 13 enables a continuous high-resistance layer 13 including $SiO_2$ as a major component to be formed. Such a high-resistance layer 13 could be considered to further reduce the exposed portions of the sintered body 11, which consequently enables the multilayer varistor 1, in which the occurrence of the migration at the surface of the high-resistance layer 13 is further suppressed, to be manufactured.

Examples of the application method include spraying, immersion, and printing. The spraying in this case is preferably performed on a plurality of sintered bodies 11 mixed by being stirred.

The method (ii) includes reacting the sintered body 11 including ZnO as the major component with $SiO_2$ to change a surface region of the sintered body 11 to a high-resistance layer 13 including $Zn_2SiO_4$ as a major component, thereby forming the high-resistance layer 13. Specifically, this method can be performed by, for example, bonding powder or a liquid including $SiO_2$ to the sintered body 11 including ZnO as the major component and then performing thermal treatment.

The method (iii) includes thermally diffusing alkali metal into the sintered body 11 to change the surface region of the sintered body 11 to the high-resistance layer 13, thereby forming the high-resistance layer 13. This method can specifically be performed by, for example, mixing the sintered body 11 with a liquid including alkali metal powder or alkali metallic salt as a major component, and then performing thermal baking.

The second step preferably includes a spraying step and a thermal treatment step in a manner similar to the method (i). The spraying step includes spraying a solution including a precursor of the high-resistance layer 13 onto a plurality of sintered bodies 11 while stirring the plurality of sintered bodies 11. The thermal treatment step includes forming the high-resistance layer 13 by thermally treating the sintered body 11 provided with the precursor. According to this method, in the course of thermally treating the sintered body 11 provided with the precursor, the high-resistance layer 13 having the plurality of cracks 20 in its surface can be formed, so that the occurrence of the migration can be suppressed.

The Ra of the surface of the high-resistance layer 13 after the second step is preferably greater than the Ra of the surface of the sintered body 11 after the first step. Appropriately selecting the method of forming the high-resistance layer 13 enables the Ra of the surface of the high-resistance layer 13 to be increased, which consequently enables the occurrence of the migration to be further suppressed.

The average thickness of the high-resistance layer 13 after the second step is preferably greater than the Ra of the surface of the sintered body 11 after the first step. In this case, exposed portions of the sintered body 11 could be considered to further decrease, so that the occurrence of the migration can be further suppressed. When the average thickness of the high-resistance layer 13 is less than the Ra of the surface of the sintered body 11, part of the sintered body 11 of the multilayer varistor 1 is exposed, and plating deposition and/or the migration are/is likely to occur. Further, the Ra of the surface of the high-resistance layer 13 after the second step is preferably greater than or equal to 0.06 μm and less than or equal to 0.9 μm.

Furthermore, the Ra of the surface of the high-resistance layer 13 after the second step can be controlled by, for example, a method of performing surface polishing by a rotating pot containing polishing powder, a method adopting blasting, or the like. The Ra of the surface of the sintered body 11 after the first step can be controlled by, for example, a method of performing dissolution treatment on the surface of the sintered body 11 by acid treatment. The dissolution treatment causes elution of some particles of the sintered body 11 and formation of grain boundaries, thereby increasing the Ra of the surface of the sintered body 11, and therefore, adopting the sintered body 11 enables the surface of the high-resistance layer 13 to have an increased Ra after the second step.

[Third Step]

The third step includes applying the primary electrode paste such that the primary electrode paste covers part of the high-resistance layer 13 and comes into contact with part of the internal electrodes 12.

The primary electrode paste can be prepared by mixing a metallic component including, for example, Ag powder, AgPd powder, AgPt powder, or the like, a glass component including $Bi_2O_3$, $SiO_2$, $B_2O_5$, or the like, and a solvent together. As the primary electrode paste, a paste including Ag as a major component and including a resin component may be used. After the application of the primary electrode paste, baking is performed at a temperature higher than or equal to 700° C. and lower than or equal to 800° C., thereby promoting alloying with the internal electrodes 12, and the primary electrodes 15 having improved adhesion can be formed.

[Fourth Step]

The fourth step includes forming the plating electrodes 16 such that the plating electrodes cover at least part of the primary electrodes 15 formed from the primary electrode paste. A method of forming the plating electrodes 16 is, for example, sequentially performing Ni plating and Sn plating by an electrolytic plating method.

EXAMPLES

The present disclosure will be more specifically described below with reference to examples, but the present disclosure is not limited to the examples below.

A multilayer varistor 1 was prepared by the following steps.

(Preparation of Slurry)

ZnO which is a major component, $Pr_6O_{11}$, $Co_2O_3$, $CaCO_3$, $Cr_2O_3$, or the like which is a minor component, and a binder were mixed together, thereby preparing a slurry.

(Production of Ceramic Sheet)

The slurry thus prepared was molded into a predetermined thickness of greater than or equal to 20 μm and less than or equal to 50 μm, thereby producing ceramic sheets.

(Production of Laminate Body)

As the internal electrode paste, a Pd paste was used. The internal electrode paste was printed, in a predetermined shape, onto some of the ceramic sheet thus produced. The ceramic sheets on which the internal electrode paste was printed and the ceramic sheets on which the internal electrode paste was not printed were stacked on each other, thereby obtaining a laminate having a predetermined electrode structure. The laminate thus obtained was pressed to a predetermined thickness and was then cut into a length of 1.0 mm, a width of 0.5 mm, and a height 0.5 mm, thereby producing a laminate body.

(Production of Sintered Body)

The laminate body thus produced was debindered at a temperature of higher than or equal to 300° C. and lower than or equal to 500° C. and was then baked at a temperature of higher than or equal to 800° C. and lower than or equal to 1300° C., thereby producing a sintered body.

(Formation of High-Resistance Layer)

Onto the sintered body thus produced, a coating liquid containing polysilazane was sprayed by using a spray, and then the precursor adhered to the sintered body was cured at a temperature of higher than or equal to 400° C. and lower than or equal to 600° C., thereby forming a high-resistance layer.

(Formation of Primary Electrode)

Ag powder, glass frit, and a solvent were mixed together, thereby preparing a primary electrode paste. The primary electrode paste was applied to the end surfaces of the sintered body provided with the high-resistance layer and was then baked at 800° C., thereby forming primary electrodes.

(Formation of Plated Electrode)

On the primary electrodes thus formed, Ni plating electrodes having a predetermined thickness were formed by electrolytic plating, and then, Sn plating electrodes were formed on the Ni plating electrodes.

Conditions of, for example, the concentration, the rate of spraying, and the like of the coating liquid in forming the high-resistance layer were selected, thereby producing the multilayer varistor 1.

(3) Variations

The embodiment described above is merely an example of various embodiments of the present disclosure. Various modifications may be made depending on design and the like as long as the object of the present disclosure is achieved.

Variations of the embodiment described above will be described below.

In the multilayer varistor 1 of the embodiment, the pair of external electrodes 14 are provided on the pair of end surfaces opposite to each other, but the number and locations of the external electrodes 14 are not limited to this example. For example, a pair of external electrodes may be provided on the pair of side surfaces opposite to each other, or a pair of external electrodes may be provided on the pair of end surfaces and a pair of external electrodes may be provided on the pair of side surfaces.

Further, in the sintered body 11, one first internal electrode 12A electrically connected to the first external electrode 14A and one second internal electrode 12B electrically connected to the second external electrode 14B are provided, but the number of each of the first internal electrode 12A and the second internal electrode 12B is not limited to one. In the sintered body 11, a plurality of first internal electrodes 12A electrically connected to the first external electrode 14A may be provided, or a plurality of second internal electrodes 12B electrically connected to the second external electrode 14B may be provided.

In the foregoing description of the embodiment, if one of two values, being compared with each other, is "greater (higher) than or equal to" the other, the phrase "greater (higher) than or equal to" may also be a synonym of the phrase "greater (higher) than". That is to say, it is arbitrarily changeable, depending on selection of the threshold value or any preset value, whether or not the phrase "greater (higher) than" covers the situation where the two values, being compared with each other, are equal to each other. Therefore, from a technical point of view, there is no difference between the phrase "greater (higher) than or equal to" and the phrase "greater (higher) than". Similarly, the phrase "less (lower) than or equal to" may be a synonym of the phrase "less (lower) than" as well.

SUMMARY

As described above, a multilayer varistor (1) of a first aspect includes: a sintered body (11); a first internal electrode (12A), a second internal electrode (12B), a first external electrode (14A), a second external electrode (14B), and a high-resistance layer (13). The first internal electrode (12A) and the second internal electrode (12B) are disposed in the sintered body (11). The first external electrode (14A) is disposed on a surface of the sintered body (11) and is electrically connected to the first internal electrode (12A). The second external electrode (14B) is disposed on the surface of the sintered body (11) and is electrically connected to the second internal electrode (12B). The high-resistance layer (13) covers at least part of the surface of the sintered body (11). The high-resistance layer (13) has a surface having a plurality of cracks (20).

According to this aspect, the plurality of cracks (20) are provided in the surface of the high-resistance layer (13), thereby increasing the creepage distance between the first external electrode (14A) and the second external electrode (14B). Thus, even when application of a voltage between the first external electrode (14A) and the second external electrode (14B) in a high-humidity environment results in elution of metal ions from the external electrode on the anode side, the metal ions have to move an increased distance to reach the external electrode on the cathode side. Therefore, a migration barrier against the metal ions eluted from the external electrode on the anode side is increased, thereby suppressing the occurrence of the migration.

In a multilayer varistor (1) of a second aspect referring to the first aspect, an arithmetic mean value of lengths of the plurality of cracks (20) is greater than or equal to 10 μm and less than or equal to 50 μm.

This aspect enables the occurrence of the migration to be suppressed while the sintered body (11) which is a base of the high-resistance layer (13) is suppressed from being exposed.

In a multilayer varistor (1) of a third aspect referring to the first or second aspect, an arithmetic mean value of widths of the plurality of cracks (20) is greater than or equal to 0.1 μm and less than or equal to 2 μm.

This aspect enables the occurrence of the migration to be suppressed while the sintered body (11) which is a base of the high-resistance layer (13) is suppressed from being exposed.

In a multilayer varistor (1) of a fourth aspect referring to any one of the first to third aspects, an average thickness of the high-resistance layer (13) is greater than or equal to 0.01 μm and less than or equal to 5 μm.

This aspect enables the occurrence of the migration to be suppressed while the sintered body (11) which is a base of the high-resistance layer (13) is suppressed from being exposed.

In a multilayer varistor (1) of a fifth aspect referring to any one of the first to fourth aspects, the plurality of cracks (20) each have a deepest portion located within the high-resistance layer (13).

This aspect enables a crack from being formed in the sintered body (11), thereby suppressing the strength of the sintered body (11) from decreasing.

In a multilayer varistor (1) of a sixth aspect referring to any one of the first to fifth aspects, the high-resistance layer (13) includes $SiO_2$ as a major component.

According to this aspect, using, as the major component of the high-resistance layer (13), $SiO_2$ having a resistivity higher than a resistivity of the sintered body (11) enables the occurrence of the migration to be suppressed while plating is suppressed from depositing.

In a multilayer varistor (1) of a seventh aspect referring to any one of the first to fifth aspects, the high-resistance layer (13) includes $ZnSiO_4$ as a major component.

According to this aspect, using, as the major component of the high-resistance layer (13), $ZnSiO_4$ having a resistivity higher than a resistivity of the sintered body (11) enables the occurrence of the migration to be suppressed while plating is suppressed from depositing.

In a multilayer varistor (1) of an eighth aspect referring to any one of the first to seventh aspects, an arithmetic mean roughness of the surface of the high-resistance layer (13) is greater than or equal to 0.06 μm and less than or equal to 0.9 μm.

This aspect increases the creepage distance between the first external electrode (14A) and the second external electrode (14B). Therefore, even when application of a voltage between the first external electrode (14A) and the second external electrode (14B) in a high-humidity environment results in elution of metal ions from the external electrode on the anode side, the metal ions have to move an increased distance to reach the external electrode on the cathode side. Therefore, a migration barrier against the metal ions eluted from the external electrode on the anode side is increased, thereby suppressing the occurrence of the migration.

The configurations of the second to eighth aspects are not essential to the multilayer varistor (1) and may thus be omitted accordingly.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A multilayer varistor comprising:

a sintered body;

a first internal electrode and a second internal electrode which are disposed in the sintered body;

a first external electrode disposed on a surface of the sintered body and electrically connected to the first internal electrode;

a second external electrode disposed on the surface of the sintered body and electrically connected to the second internal electrode; and a high-resistance layer covering at least part of the surface of the sintered body, wherein:

the high-resistance layer has a surface having a plurality of cracks, and an arithmetic mean value of lengths of the plurality of cracks is greater than or equal to 10 μm and less than or equal to 50 μm.

2. The multilayer varistor of claim 1, wherein an arithmetic mean value of widths of the plurality of cracks is greater than or equal to 0.1 μm and less than or equal to 2 μm.

3. The multilayer varistor of claim 2, wherein the plurality of cracks each have a deepest portion located within the high-resistance layer.

4. The multilayer varistor of claim 1, wherein an average thickness of the high-resistance layer is greater than or equal to 0.01 μm and less than or equal to 5 μm.

5. The multilayer varistor of claim 1, wherein the plurality of cracks each have a deepest portion located within the high-resistance layer.

6. The multilayer varistor of claim 1, wherein the high-resistance layer includes $SiO_2$ as a major component.

7. The multilayer varistor of claim 1, wherein the high-resistance layer includes $ZnSiO_4$ as a major component.

8. The multilayer varistor of claim 1, wherein an arithmetic mean roughness of the surface of the high-resistance layer is greater than or equal to 0.06 μm and less than or equal to 0.9 μm.

9. A multilayer varistor comprising:

a sintered body;

a first internal electrode and a second internal electrode which are disposed in the sintered body;

a first external electrode disposed on a surface of the sintered body and electrically connected to the first internal electrode;

a second external electrode disposed on the surface of the sintered body and electrically connected to the second internal electrode; and a high-resistance layer covering at least part of the surface of the sintered body, wherein:

the high-resistance layer has a surface having a plurality of cracks, and an arithmetic mean value of widths of the plurality of cracks is greater than or equal to 0.1 μm and less than or equal to 2 μm.

10. The multilayer varistor of claim 9, wherein an average thickness of the high-resistance layer is greater than or equal to 0.01 μm and less than or equal to 5 μm.

11. The multilayer varistor of claim 9, wherein the plurality of cracks each have a deepest portion located within the high-resistance layer.

12. A multilayer varistor comprising:

a sintered body;

a first internal electrode and a second internal electrode which are disposed in the sintered body;

a first external electrode disposed on a surface of the sintered body and electrically connected to the first internal electrode;

a second external electrode disposed on the surface of the sintered body and electrically connected to the second internal electrode; and a high-resistance layer covering at least part of the surface of the sintered body, wherein:

the high-resistance layer has a surface having a plurality of cracks, and an average thickness of the high-resistance layer is greater than or equal to 0.01 μm and less than or equal to 5 μm.

13. The multilayer varistor of claim 12, wherein the plurality of cracks each have a deepest portion located within the high-resistance layer.

* * * * *